United States Patent [19]

De Witt

[11] Patent Number: 4,678,324

[45] Date of Patent: Jul. 7, 1987

[54] RANGE FINDING BY DIFFRACTION

[76] Inventor: Thomas De Witt, Box 83, Ancramdale, N.Y. 12503

[21] Appl. No.: 804,590

[22] Filed: Dec. 4, 1985

[51] Int. Cl.[4] .......................... G01C 3/00; G01B 11/02
[52] U.S. Cl. ...................................... 356/45; 356/355; 356/356
[58] Field of Search ................ 356/4.5, 355, 356, 357, 356/358, 354

[56] References Cited

U.S. PATENT DOCUMENTS 3,199,400 8/1965 Zabinski ........................... 356/4.5 X

OTHER PUBLICATIONS

"Position Monitoring Technique Using Double Diffraction Phenomenon", Patorski, Optics Communications, 12-1978, pp. 303–306.

*Primary Examiner*—Davis L. Willis
*Assistant Examiner*—S. A. Turner
*Attorney, Agent, or Firm*—Schmeiser, Morelle & Watts

[57] ABSTRACT

A method for determining range by correlating the relationship between the distance of a diffraction grating from a monochromatically illuminated target surface with the respective relative displacements of higher order diffraction images from the position of the zero order image as observed through the diffraction grating. An apparatus suggested for embodying the aforesaid method.

7 Claims, 2 Drawing Figures

RANGE FINDING BY DIFFRACTION

FIELD OF THE INVENTION

The present invention relates generally to the concept of ranging by use of optical range finder mechanisms, and relates more particularly to a method which determines range by correlating the relationship between the distances of a diffraction grating from a monochromatically illuminated target surface with the respective relative displacements of higher order diffraction images from the position of the respective zero order image as observed through the grating.

BACKGROUND AND OBJECTS OF THE INVENTION

Optical range finders may be characterized as cameras which record distance information. Conventional two-dimensional cameras record the brightness of objects in incident or reflected light. Range finding cameras produce images in which the brightness of the image is determined by its distance from the camera.

There are essentially two types of optical range finding camera, active and passive. The active-passive distinction lies in how the target object is illuminated. Active range finders control the source of illumination of the target, while passive devices depend only upon ambient illumination.

There are three major principles applied in passive range finding: shape analysis, multiple (typically stereo) view, and depth-of-field or optical focus analysis. Embodiments of all three passive range finding principles can be realized with conventional two-dimensional cameras. For example, one form of shape analysis is realized by observing and recording (photographing) a target object of known size and determining its distance from the camera by simply measuring its recorded size. Alternatively, if two horizontally offset views of an object are photographed, and the two photographs are placed in registration at some point of known depth, the range of any other correlated elements can be measured by measuring their disparity in the horizontal dimension between the registered photographs. Such a method of multiple view is a variation on the process of triangulation, which is also used in active range finding. The final passive category is depth-of-field or focus analysis. Relying on the fact that the radius of the circle of confusion of a defocused lens is proportional to the distance of the subject from the lens, a lens barrel can be calibrated so that placement of an object in best focus will give a direct reading of its distance by referring to the lens barrel's graduated scale.

Active range finding with light requires a source of illumination controlled by the rangefinder. The most intensely researched areas are triangulation, time of flight (LADAR), projecting pattern (Moire), and focus calibration. In triangulation, the second camera of the stereo system is replaced by a structured light source such as a projector. Typically, the projector originates a sheet of light. If viewed directly on axis with a projector, the sheet of light would appear as a straight line, no matter what the depth contour of the surface it strikes. Alternatively, if viewed from an offset position, the sheet of light appears to bend. The contour of the bend in the sheet of light can be easily correlated to depth.

Another structured light method requires the projection of a pair of regularly spaced two-dimensional patterns on the subject. The two patterns interfere with each other to create a Moire pattern which can be easily photographed. The topographical contours in a Moire are pro-portional to change in distance of the subject from the camera. LADAR is similar to electromagnetic ranging by radar. The difference is that a pulse modulated laser is used as the active source of illumination. Specially designed sensors in the range finder measure the time of flight of the light front from the laser to the target and back to the rangefinder. LADAR systems are expensive, cumbersome and inaccurate, but they have one very important advantage over triangulation and Moire based systems, the illumination source is coaxial with the sensor. As a result, there are no occlusions or shadows in the ranged image.

Another coaxial system of active light ranging is focus calibration (analysis). In such a system, a pencil beam of light is sent out from the camera. The radius of the circle of confusion of the beam, as seen through a calibrated lens, is a measure of the target's distance.

Irrespective of the activity or passivity of optical rangefinders, a singular common disadvantage of their employment is generally evident. All of the known systems require rather extensive and elaborate optics, painstaking calibration, biaxial illuminating and recording systems, or highly sophisticated devices for the solution of rather high order mathematical models. A review of the prior art in optical range measurement has disclosed a technique which allows real-time range data acquisition without suffering the first three of the aforementioned disadvantages. Work in this field conducted by P. Chavel and T. C. Strand while they were both at the Image Processing Institute, University of Southern California, Los Angeles, CA, revealed that range could be measured using Talbot diffraction imaging of gratings. In an article appearing in *Applied Optics*, Vol. 23, No. 6, Mar. 15, 1984, Chavel and Strand discussed a technique which has real-time measurement capability and which differs from most of its predecessors in two fundamental aspects: the physical phenomenon on which it is based and the measured variable. The technique exploited the phenomenon of diffraction and measured the fringe contrast variable. Chavel and Strand relied upon the fact that the fringe contrast in the Fresnel diffraction pattern of a grating varies as a function of the distance from the grating and the frequency of the light. It was abundantly apparent, however, that measurement of the fringe contrast gives rise to disadvantages. In order to obtain arbitrary range information, the source of monochromatic, coherent light illumination would need to be swept at discrete frequencies through the entire electromagnetic spectrum. Such techniques embody needless expense and, in situations where ranging dimensions are under ten meters, needless sophistication. To the applicant, it seemed that an important factor in the Chavel-Strand technique, had been overlooked, and it appeared that the diffraction phenomenon ought to be further explored.

Diffraction gratings are optical devices which have been in use for a wide range of applications for over one hundred years. They are made by ruling optical materials with equally spaced lines, having centers which approach the wavelength of light. The behavior of light reflected or transmitted by diffraction grating has been a subject of innumerable dissertations, monographs, articles and texts. In the extant body of literature, one finds the theoreticcal explanation for the phenomenon central to the invention of rangefinding by diffraction, but no contemporary literature available to the applicant, nor an exhaustive search of patents, has produced an explicit suggestion of this application, save the aforementioned work of Chavel and Strand.

Diffraction phenomena are often divided into two general classes: Fraunhoffer diffraction and Fresnel diffraction. The former is the simpler case where the light striking the grating is treated as a plane wave. If on the other hand, the wave front exhibits curvature relative to the spacings of the grating, secondary diffraction effects must be calculated using the more complex Fresnel analysis. Notably, an illuminated point source radiates light having a spherical wave front. In finely spaced gratings such as those created by holography, the effect of the curved wavefront is noticeable at distances of several meters, a useful range for some applications of range finding.

The applicant sought to develop a method of range finding by utilization of the diffraction phenemonon, more specifically by expressing the angular displacement of diffraction image orders as a function of the distance of a point-source of light from a diffraction grating. If a monochromatic point source of light is viewed through a diffraction grating, multiple images of the point source will be observed. The zero order diffraction image appears at the true position of the point source, but the higher order diffraction images will be offset by an angle determined by the frequency of the grating, the distance of the point source from the grating, and the color of light radiating from the point source. Notably, the effect of angular displacement of higher order diffraction images, as a function of the distance of the point-source can only be observed in the Fresnel case of diffraction, that is, when the wavefront from the point source is curved relative to the size of the grating. Ranging with this method would be most accurate when the point source is close to the grating. The rate of angular displacement falls off exponentially as the point soure recedes from the grating. (An initial experiment clearly showed a measurable shift in the angle of displacement of the first order diffraction of a red point-source target at a distance of one meter with a ten mm grating of 600 lines per mm. The grating was observed at a distance of ten centimeters by a 100 mm focal length lens focusing on a one half inch Vidicon televisison tube.)

The simplest embodiment of the method described above would contemplate projection of a monochromatic pencil beam of light at a target, observation of the target through a grating, and measurement of the displacement of the higher order diffraction images from the position of the zero order image. Such a rangefinder could be calibrated simply by taking measurements of a calibrated target to establish a correlated scale of displacement-to-distance. The readings of displacement could be taken by eye with a calibrated viewer or with electronic sensors, such as linear array of photocells or a television camera. The device would be most effective if the projected beam and the view finder were optically coaxial. This would permit ranging of all points within view.

More sophisticated implementations of the method would employ one or two movable mirrors to alter the coaxial projection and view angle over a horizontal and vertical field. This would permit the acquisition of range information pixel by pixel of three dimensional surfaces. Such scanning devices are known within the art. The inclusion of a diffraction grating within the scanner to acquire range information has not been previously disclosed in the literature available to the applicant.

It is possible to fabricate many different pitches of diffraction gratings on a single substrata. Techniques for such fabrication include electron beam lithography and holographic optical elements (HOE'S). Arrays of diffraction gratings of different orders would allow the measurement of range in discrete steps. In such an embodiment, light at discrete increments of distance would produce unique displacements in individual gratings.

To extend the range of measurement beyond the limit of the Fresnel case, diffraction gratings could be used to measure the size of distant objects. If a line or square of light is projected, it will be seen as a continuous object until it is at a sufficient distance for a grating to separate its first order diffraction image from its zero order image. As in the discrete array described above, the distance of the target can be gauged by examining at which pitch of grating a line or solid object separates into three discrete images (two images from the first order diffraction and one from the zero order image in the center of the field of view). This type of ranging is similar to shape analysis, but it is made more convenient with the use of the method described above.

The foregoing examination of ranging methods and diffraction imaging has indicated disadvantages and advantages which the applicant has sought to avoid or inculcate, respectively, in the present invention.

It is therefore an object of this invention to develop an accurate ranging method employable for very close distance ranging, say zero to three meters, with greatest accuracy in proximity of the observed subject or target.

Another object of this invention is to avoid the excessive use of optical devices.

Another object of this invention is to develop a system which may be easily calibrated.

Still another object of this invention is to avoid the necessity of biaxial illumination and recording subsystems.

Yet another object of this invention is to provide a ranging system which will not have to rely upon sophisticated analysis or synthesis techniques and equipment, but rather, can be realized by equipment normally available in the university or small company in its processing, visual aids, or optical computing laboratories.

Objects and advantages of the invention have been set forth in part above and will be obvious in part from, or learned by practice with, the invention. The invention consists in the parts, constructions, embodiments and combinations, herein shown and described, or as may be inferred by reading this document.

SUMMARY OF THE INVENTION

It has been found that the objects of this invention may be realized by projecting a monochromatic pencil beam of light at a target, viewing the illuminated target through a diffraction grating, and measuring the displacement of the higher order diffraction images from the position of the zero order image. Calibration of the range finder entails the taking of measurements of the target at known distances and establishment of a correlated scale of the image displacements to target distances. No occlusions occur if the projected beam and the view finder are optically coaxial. Such an arrangement suggests minimal optics, ease of calibration, compact scale due to the coaxial illumination and recordation subsystems, and the absence of sophisticated mathematical analysis and synthesis equipment.

BRIEF DESCRIPTION OF THE DRAWINGS of the drawings:
FIG. 1 depicts the Fresnel diffraction of a curved wave front;
FIG. 2 is an illustration of the preferred embodiment of the ranging apparatus.

DESCRIPTION OF THE PREFERRED EMBODIMENT

Figure 1:
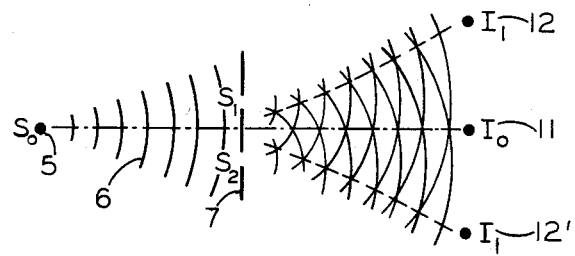
Figure 2:
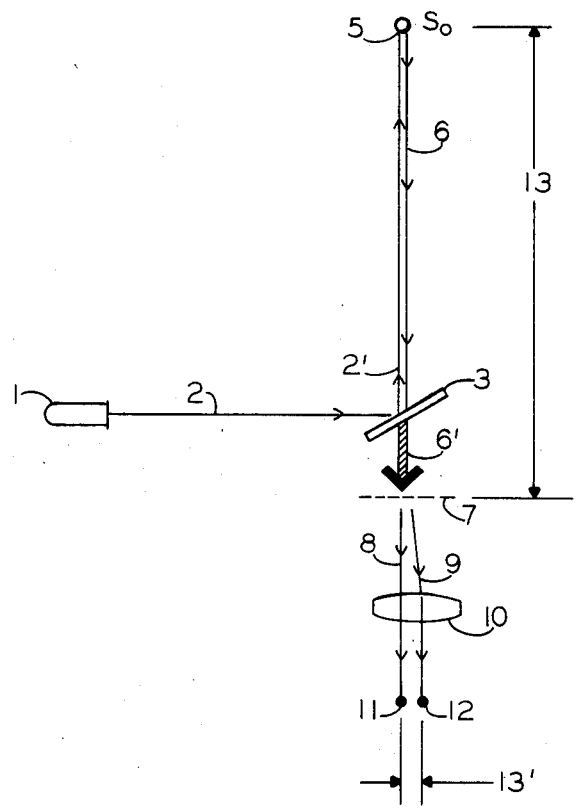

Referring now more particularly to FIGS. 1 and 2 of the accompanying drawings, FIG. 1 depicts the propagation of a wave front emanating from point-source $S_o$ 5 and its approach to the diffraction grating 7. At points $S_1$ and $S_2$ of the diffraction grating 7, the curved wave front 6 is diffracted. The resultant wave patterns on the other side of the diffraction grating interact with the wave fronts propagating through adjacent apertures and, consequently, interfere with or reinforce each other. The loci of points of wave front reinforcement are terminated at $I_o$ 11 and $I_1$ 12 and 12', the respective zero order and first order images.

As preferrably embodied, FIG. 2 depicts a simple apparatus which utilizes the Fresnel Diffraction phenomenon depicted in FIG. 1. A monochromatic light source 1 focuses a monochromatic beam of light 2 on the face of beam splitter 3. The light beam is reflected along an alternate path 2' to the target 5. Thus illuminated, $S_o$, or a similar point-source, propagates light back along the path 6 of its original generation passing through beam splitter 3 and emerging as beam 6'. The beam 6' is curved as depicted by the stylized arrowhead just prior to its encountering the diffraction grating 7. At the diffraction grating 7, the beam is diffracted in a manner similar to that portrayed and explained in FIG. 1. For purposes of clarity, wave fronts or beams corresponding only to the zero order image 8 and one first order image 9 are portrayed. The images are focused through objective lens 10, appear and are displayed as zero order image 11 and first order image 12. An observable and experimentally repeatable phenomenon is noted in the correspondence of the distance 13, that is, the point source $S_o$ 5 from the diffraction grating 7, and the displacement 13' between the zero order image 11 and a first order image 12.

To persons skilled in the art, it is readily apparent that the objective lens 10 may be replaced by a video camera and the images 11 and 12, traditionally projected onto a plane surface, would appear on a video screen. Hereafter, it is a small task to calibrate the device so that the range 13 is correlated to the displacement 13'.

The invention in its broader aspects should not be viewed as limited to the drawings nor the specific embodiment discussed herein; but rather, variations and departures may be made therefrom, within the scope of the accompanying claims, so as to adhere to the principals of the invention and garner its benefits.

What is claimed is:

1. A method for determining range by correlating the relationship between the distances of a diffraction grating from an illuminated target surface with the respective relative displacements of high order diffraction images from the position of the respective zero order image as observed through said grating.

2. The method of claim 1 including the step of illuminating said target with monochromatic light.

3. A method for optically determining range comprising:
   observing light from a distant point-source passing through a diffraction grating whereby the point-source light wavefront is split into multiple wavefronts corresponding to a multiplicity of diffraction images of varying order; and
   correlating the apparent displacement of higher order diffraction images from their respective zero order image with the physical distance of said point source from said diffraction grating.

4. The method of claim 3 including the step of illuminating the point source with monochromatic light.

5. An apparatus for performing the method applied in claims 1 and 3, comprising:
   a source of monochromatic light to be used to illuminate a target for which data are sought;
   a diffraction grating which receives target-reflected light and splits its wavefront into multiple order diffraction images; and
   means for observing and differentiating between the order displacement of said diffraction images whereby their displacement from the zero order image position may be compared to the absolute distance of said diffraction grating from said target.

6. The invention of claim 5 wherein the diffraction grating comprises equally spaced ruled lines so as to obtain at least two adjacent spacings equal to an integral multiple of one wavelength of said monochromatic light.

7. The invention of claim 5 wherein the observing means comprises a video camera.

* * * * *